United States Patent
Hashem et al.

(10) Patent No.: US 7,151,944 B2
(45) Date of Patent: Dec. 19, 2006

(54) METHOD AND APPARATUS FOR USING SYNCHRONOUS CDMA IN A MOBILE ENVIRONMENT

(75) Inventors: Bassam M Hashem, Nepean (CA); David G Steer, Nepean (CA); Robert Matyas, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1064 days.

(21) Appl. No.: 09/965,272

(22) Filed: Sep. 27, 2001

(65) Prior Publication Data

US 2003/0058833 A1    Mar. 27, 2003

(51) Int. Cl.
*H04B 7/01* (2006.01)
(52) U.S. Cl. ............ 455/502; 455/422.1; 455/65
(58) Field of Classification Search .......... 455/502, 455/422.1, 65; 370/342, 335, 441; 375/130, 375/140
See application file for complete search history.

(56) References Cited

U.S. PATENT DOCUMENTS

| | | | | |
|---|---|---|---|---|
| 5,649,303 A | * | 7/1997 | Hess et al. | 455/63.3 |
| 6,002,919 A | * | 12/1999 | Posti | 455/554.2 |
| 6,421,334 B1 | * | 7/2002 | Baines | 370/342 |
| 6,529,494 B1 | * | 3/2003 | Ostman et al. | 370/337 |
| 6,600,933 B1 | * | 7/2003 | Hiramatsu et al. | 455/561 |
| 2002/0093940 A1 | * | 7/2002 | Toskala et al. | 370/350 |

* cited by examiner

*Primary Examiner*—Melur Ramakrishnaiah
(74) *Attorney, Agent, or Firm*—Barnes & Thornburg LLP

(57) ABSTRACT

The present invention relates to a method and apparatus for reducing interference arising from signal propagation delay in multipath signal environments in wireless communication systems. The present invention provides a method of operating a mobile communications base station which receives multipath components of signals from a number of high mobility subscriber terminals, the method comprising: for each subscriber terminal signal received, determining a best signal component; determining the difference in time between reception of said best signal component and a reference time; transmitting to said terminal a transmission timing offset in order to receive said best component at substantially said reference time.

18 Claims, 15 Drawing Sheets

| 7 bit TAC | function |
|---|---|
| 0000000 | do nothing |
| 0000001 | if this is the only weighted bit set – advance time by table entry 0 (default 1/8 chip, tracking mode) if this is set in combination with other weighted bits – advance time by table entry 1 (default 1/4 microsecond) |
| 0000010 | advance time by table entry 2 (default 1/2 microsecond) |
| 0000100 | advance time by table entry 3 (default 1 microsecond) |
| 0001000 | advance time by table entry 4 (default 2 microseconds) |
| 0010000 | advance time by table entry 5 (default 4 microseconds) |
| 0100000 | advance time by table entry 6 (default 8 microseconds) |
| 1000000 | do nothing |
| 1000001 | if this is the only weighted bit set – retard time by table entry 0 (default 1/8 chip, tracking mode) if this is set in combination with other weighted bits – retard time by table entry 1 (default 1/4 microsecond) |
| 1000010 | retard time by table entry 2 (default 1/2 microsecond) |
| 1000100 | retard time by table entry 3 (default 1 microsecond) |
| 1001000 | retard time by table entry 4 (default 2 microseconds) |
| 1010000 | retard time by table entry 5 (default 4 microseconds) |
| 1100000 | retard time by table entry 6 (default 8 microseconds) |

*Fig. 6c*

METHOD AND APPARATUS FOR USING SYNCHRONOUS CDMA IN A MOBILE ENVIRONMENT

FIELD OF THE INVENTION

The present invention relates to a method and apparatus for reducing interference arising from signal propagation delay in multipath signal environments in wireless communication systems. In particular, although not exclusively, the invention relates to the application of Synchronous Code Division Multiple Access (S-CDMA) to a mobile communications system in a multipath signal propagation environment.

BACKGROUND OF THE INVENTION

Multiple radio signal paths result from signal reflections from objects such as buildings or vehicles so that a receiver may receive more than one copy of a transmitted signal. The different copies are often delayed in time due to different signal path propagation lengths. Such an environment is shown in FIG. 1. By using devices such as RAKE receivers, different copies of the signal from one transmitter that are separated in time can be received and coherently combined to produce a coherent received signal comprising the majority of the received signal power. However, if there are multiple, non time aligned signals these do result in mutual interference. To some extent, these multipath environments can be compensated for, particularly in relatively static networks such as fixed wireless access networks, where the receivers and transmitters are stationary. In fixed wireless access (FWA) networks, the multipath environment changes only relatively slowly, for example due to the growth of leaves on trees, and these changes can be accommodated to some extent by the arrangements described below. In a FWA environment, the rapid changes in the multipath environment, such as those due to movement of vehicles, are minimised by placing subscriber terminal antennas at (or above) roof top level.

The applicant's co-pending U.S. patent application Ser. No. 09/078,010 (Baines) published as EP-A-0957593 discloses a technique for time alignment of uplink CDMA signals for a static (FWA) or low mobility communication system. Baines discloses the concept of a base station signalling to subscriber terminals to alter their transmission timings for the uplink signals back to the base station such that the multiple received copies of a signal from a subscriber terminal are translated in time. By controlling the time translation of these signal copies, or components, from a number of subscriber terminals such that the main (strongest) signal component from each subscriber terminal is time aligned with the main signal component of the other subscriber stations, the effect of cross-interference between the terminals can be minimised. This is of particular advantage when the CDMA codes used by the individual subscriber terminals are designed to be orthogonal—that the integral of the product of the two codes over one (or more) full intervals of the code is zero. A well known example of orthogonal CDMA codes are the Walsh-Hadamard functions, commonly used in the downlink of CDMA mobile systems (i.e. TIA standard IS-95), (see, for example, chapter 8 of "Principles of Mobile Communication" by Gordon L. Stuber, Kluwer Academic Publishers 1995). As shown in FIG. 2, by time translating the transmissions on channel B, the main multipath signal component received on channel B can be aligned with that received on channel A from another subscriber terminal thereby eliminating the most significant interference effects between these two subscriber terminals.

The concepts disclosed in Baines may be implemented in local wireless loop or fixed wireless access (FWA) systems as synchronous code division multiple access (SCDMA). The SCDMA concepts may also be applied for terminals in a low mobility mobile environment such as an indoor mall. The 3GPP international wireless standards body for $3^{rd}$ Generation Mobile Systems, for example, has been discussing a SCDMA concept for mobile terminals in which the base station (also known as "Node-B") sends a time alignment (tracking) command every 200 milliseconds instructing a subscriber terminal to advance or delay its transmission by ⅛ of a chip. This process is described in the 3GPP standards document 3GPP TSG RAN WG 1 #19 document TR25.854 version 0.2.0 (Study Report on USTS) dated 27 Feb.–2 Mar. 2001. This document discloses an uplink synchronous transmission scheme (USTS) for low mobility terminals, especially intended for indoor and dense pedestrian environments. USTS reduces uplink intracell interference by orthogonalising the signals received from various subscriber terminals by instructing these subscriber terminals to adjust their transmission times such that the strongest received components from each terminal are synchronised. The scheme utilises a time alignment bit sent to a subscriber terminal by the base station. This bit instructs the subscriber terminal to advance or delay its transmission by ⅛ of a chip. For example a terminal moving away from the base station will increase its signal propagation time and may require its transmission timing to be advanced to compensate. By sending a series of these bits, the base station may instruct the mobile terminal to adjust its transmission timing to the desired alignment and to track changes in the alignment that may be necessary over time.

The system works by initially determining the round trip propagation delay between the base station and a subscriber terminal, the base station then setting an initial synchronisation parameter ($T_{INI}$T_SYNC) to compensate for the delay. Once a call is in progress, the synchronisation of the transmission timing can be adjusted to take account of changes in the multipath environment or the terminal's location that may alter the received time of the multiple copies of a signal from the subscriber terminal by using a time alignment bit (TAB). A proposal for standardizing this in the 3GPP system is to replace the terminal power control bit (PCB) with a TAB every two frames (20 milliseconds). As there may be errors during the transmission of the TABs, at the subscriber terminal, a number of TABs are combined over a 200 millisecond interval. If the average exceeds a threshold value the transmission is delayed by a predetermined amount (⅛ chip), whereas if the average is less than or equal to a threshold the transmission time is advanced by a predetermined amount. Other combinations of TAB and averaging intervals may alternatively be used depending on the rate of change of the multipath conditions or the motion of the terminal.

Whilst this and similar arrangements have been shown to work reasonably well in a slow changing multipath environment, they are inadequate for high mobility systems where received copies or components of a signal can change rapidly due to movement of the mobile subscriber terminals. As a mobile subscriber terminal moves about the environment, the main or highest power received signal component may suddenly fade and a previously low power signal component may become the dominant one. Furthermore, some signal components may disappear altogether and new ones may appear within a short span of time. This is due to the mobile moving amongst reflecting objects such that a reflected path may cease to exist as the mobile terminal moves into the "shadow" of a building for example. Similarly, because the mobile subscriber terminals are typically located near the ground, a reflection may cease to exist when a mobile object such as a vehicle moves past the mobile terminal. A tracking process as discussed for the standard only adjusts the transmission timing of a subscriber unit by ⅛ chip every 200 milliseconds. It would take some time to change transmission timing to align a new component of the signal and during this time interference persists. As the new component may be offset in time by up to a few microseconds, sending time alignment commands every 200 milliseconds with a step size of ⅛ chip is too slow in a mobile environment. (In the 3GPP standard ⅛ of a chip has a duration of approximately 32 nanoseconds.)

SUMMARY OF THE INVENTION

It is an object of the present invention to provide an improved technique for time alignment of signals in a multipath wireless environment. It is a further object of the present invention to provide signalling techniques for the control of a SCDMA system for application in mobile systems.

In a first aspect, the present invention provides a method of operating a mobile communications base station which receives multipath components of signals from a number of high mobility subscriber terminals, the method comprising: for each subscriber terminal signal received, determining a best signal component; determining the difference in time between reception of said best signal component and a reference time; transmitting to said terminal a transmission timing offset in order to receive said strongest component at substantially said reference time.

Applicants have discovered that time alignment within the context of a highly dynamic signal propagation environment is possible and can be implemented by providing regular single transmission time alignment command structures to the terminals which are regular enough and flexible enough in terms of timing change to cope with each change in the best determined signal component which may change every few seconds. Prior art implementations are not fast enough for high mobility communications systems. Indeed the prior art considers it not possible to apply such a system to high mobility systems.

Preferably said offset is in the form of a regular layer 1 timing alignment command having two or more offset absolute magnitude settings.

The use of layer 1 allows for rapid implementation of timing changes and hence makes high mobility terminal signal synchronisation possible. Typically signalling of this nature would be done at level 2 or higher which is too slow for this application.

Preferably the magnitude settings include a minimum setting of 1 microsecond.

The system must be able to compensate for rapid changes in the best signal component and it has been found that a minimum alignment capability of 1 micro second is required for high mobility terminals.

Preferably the best signal component is determined as that having the highest average value of a predetermined signal parameter over a predetermined time.

The invention provides a method of implementing time alignment of received signals from multiple transmitters in a high mobility wireless communications system. By investigation into the operation of such a system in a highly dynamic signal propagation environment, applicant has determined a time alignment method for a high mobility communications system in such an environment. The method provides a way of quickly and effectively determining the strongest signal component from each subscriber terminal in a highly dynamic propagation environment where the timing of this strongest component can change rapidly and unexpectedly. The subscriber terminal can then be rapidly instructed to realign its transmission timing to optimise uplink communications in SCDMA systems for example. The invention therefore provides for the reduction of interference and hence also increased system capacity.

Preferably the predetermined signal parameter is signal strength.

Preferably the average value of said predetermined parameter for a number of signal components over a shortened predetermined period are stored, and wherein in the event of fast fading of the best signal component the signal component having the next highest average value over said shortened period is determined as the best signal component.

Preferably the method further comprises determining a new said best component only if said average value is a predetermined threshold above a current best component.

Preferably the method further comprises determining a new said best component only if said difference in time is above a predetermined threshold offset.

Another aspect of the present invention provides a mobile communications base station which receives multipath components of signals from a number of high mobility subscriber terminals, the base station comprising: means for determining a best signal component for each subscriber terminal; means for determining the difference in time between reception of said best signal component and a reference time; means for transmitting to said terminal a transmission timing offset in order to receive said best component at substantially said reference time.

Preferably said offset is in the form of a regular layer 1 timing alignment command having two or more offset absolute magnitude settings.

Preferably the magnitude settings include a minimum setting of 1 microsecond.

Preferably the best signal component is determined as that having the highest average value of a predetermined signal parameter over a predetermined time.

Preferably the average value of said predetermined parameter for a number of signal components over a shortened predetermined period are stored, and wherein in the event of fast fading of the best signal component the signal component having the next highest average value over said shortened period is determined as the best signal component.

Another aspect of the present invention provides a method of operating a high mobility subscriber terminal comprising: determining a transmission timing offset transmitted from a base station; adjusting the transmission timing of said terminal according to said offset; wherein said offset is in the form of a regular layer 1 timing alignment command having two or more absolute magnitude settings.

Preferably the magnitude settings include a minimum setting of 1 microsecond.

Another aspect of the present invention provides a high mobility terminal for use in a mobile communications system, the terminal comprising: means for determining a transmission timing offset transmitted from a base station; means for adjusting the transmission timing of said terminal according to said offset; wherein said offset is in the form of a regular layer 1 timing alignment command having two or more absolute magnitude settings.

Preferably the magnitude settings include a minimum setting of 1 microsecond.

A further aspect of the present invention provides a mobile communications system having a number of high mobility terminals and a base station which receives multipath components of signals from said terminals; the base station comprising: means for determining a best signal component for each subscriber terminal; means for determining the difference in time between reception of said best signal component and on reference time; means for transmitting to said terminal a transmission timing offset in order to receive said best component at substantially said reference time; and the terminals comprising: means for determining a transmission timing offset transmitted from a base station; means for adjusting the transmission timing of said terminal according to said offset.

A yet further aspect of the invention provides a method of operating a mobile communications base station which receives multipath components of signals from a number of high mobility subscriber terminals, the method comprising: for each subscriber terminal signal received, determining a best signal component; determining the difference in time between reception of said best signal component and a reference time; transmitting to said terminal a transmission timing offset in order to receive said best component at a predetermined time.

BRIEF DESCRIPTION OF THE DRAWINGS

The present invention will now be described with reference to the following drawings, by way of example only and without intending to be limiting, in which:

FIGS. 6a–6d show a USTS downlink frame for an SCDMA communications system which has been modified to implement the present invention;

DETAILED DESCRIPTION

Figure 1:
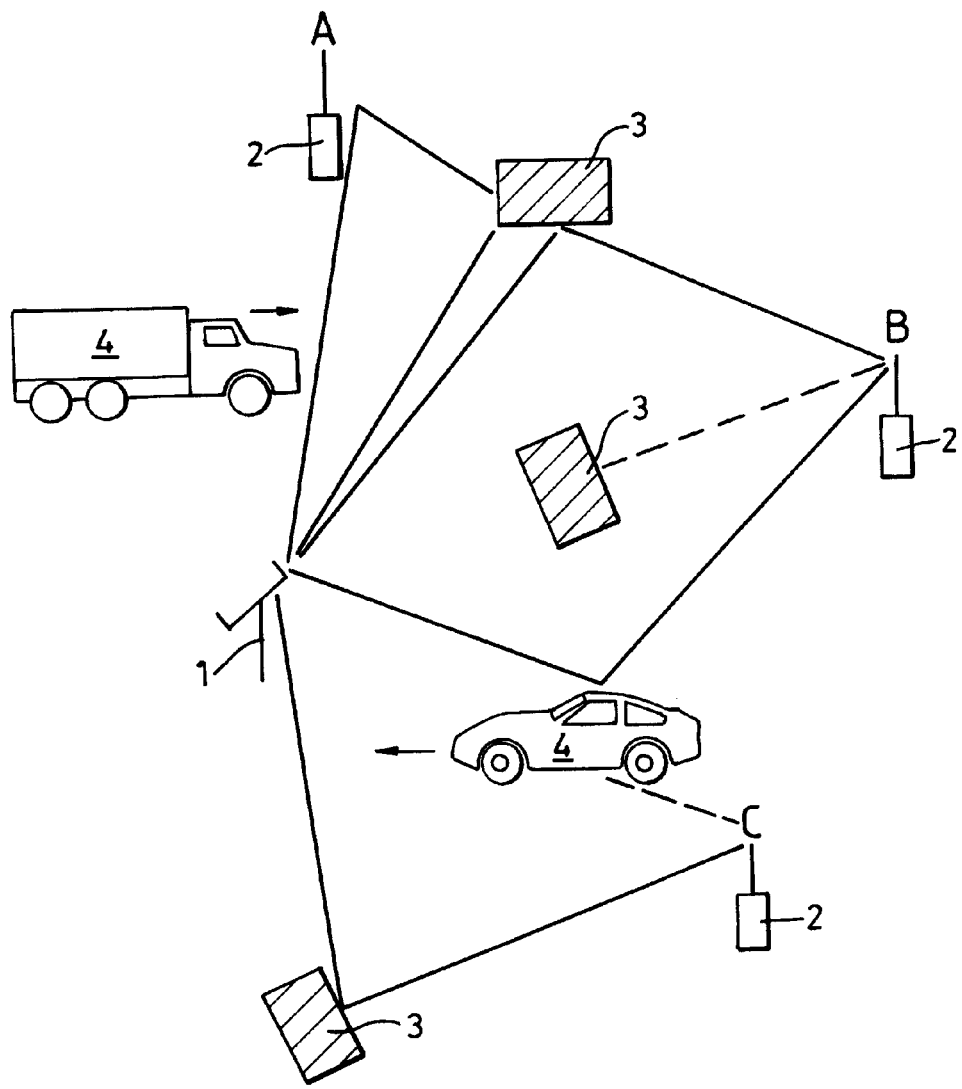
FIG. 1 shows a schematic illustration of a wireless network in a multipath propagation environment.

FIG. 1 shows a wireless communication system comprising a base station 1 and a number of subscriber terminals 2 in a multipath signal propagation environment. In such an environment signals transmitted from the base station 1 or a terminal 2 may reflect from stationary objects 3 such as buildings or moving objects 4 such as vehicles to provide more than one signal path between the subscriber terminal 2 and the base station 1 as shown. In a mobile communications system subscriber terminals 2 are typically near ground level and are therefore likely to be amongst a lot of object clutter so that many signal paths are possible. The mobile environment is also characterised by the fact that these mobile paths change rapidly. For example, as a moving object 4 changes positions the signal propagation path reflecting from this will be affected, and similarly as the mobile terminal 2 moves so all the multiple signal paths may be affected and indeed some of these component signals will rapidly disappear as the mobile subscriber terminal moves into the shadow of a building 3 for example, or a vehicle 4 moving into, and blocking, a signal component such as that shown between subscriber terminal A and the base station 1.

The applicant's co-pending US application Baines describes a technique for time alignment of uplink CDMA signals for FWA and low mobility type systems where the multipath signal components tend to be relatively static. In such FWA type systems the subscriber terminal does not move with respect to the base station, and the influence of moving objects such as vehicles is diminished by placing the subscriber terminal antennas on rooftops or high above the street level clutter. The base station is then able to determine the strongest multipath component for each subscriber terminal signal and instruct the subscriber terminals to adjust their transmission time so that these components are time aligned and therefore interference in the system is significantly reduced. However, because of the very dynamic multipath environment associated with mobile communication systems, it was not anticipated that this concept could be implemented in such systems because of the rapidly changing nature of the received multipath components. Against expectations however, further development has shown that this concept can be effectively implemented for mobile communication systems as described below.

Figure 2:
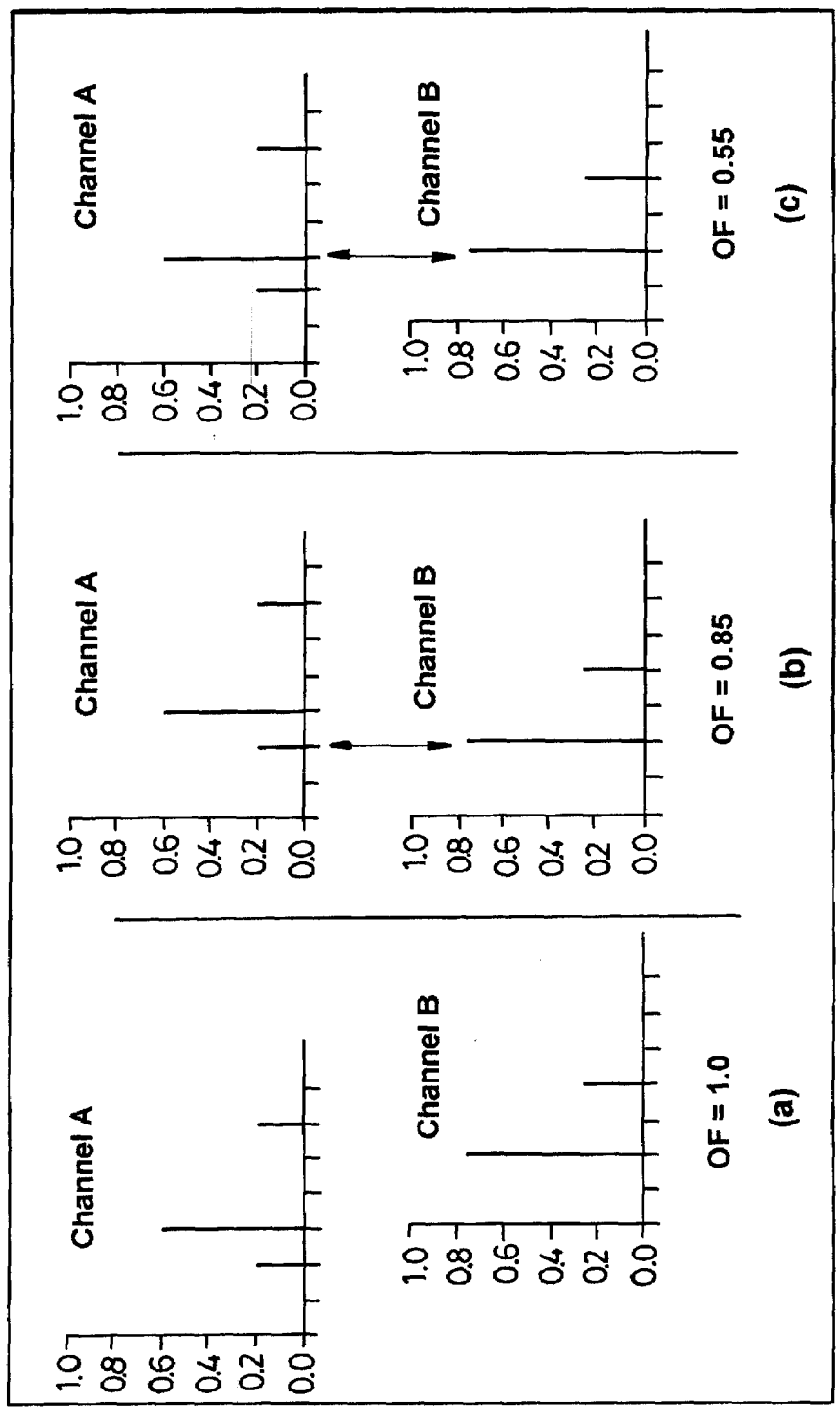
FIGS. 2 a–c show received signal timing alignment profiles for two channels which each have multipath components.

Conceptually the present invention is similar to Baines as shown in FIG. 2. In CDMA communications, individual transmissions are maintained orthogonal with respect to other transmissions on the same frequency band by multiplying each transmission with a direct sequence orthogonal code, such as a Walsh code. An additional pseudo random (PN) scrambling code may also be combined with the orthogonal code to distinguish the signals for each base station. Together, these generate a wideband transmission signal. CDMA allows multiple simultaneous signals that completely overlap in time and frequency, however the use of a unique spreading code (combination of orthogonal code and scrambling code) for each "channel" allows each transmission signal to be detected separately. The signals are distinguishable from each other where no multipath signal components exist and the transmissions are synchronised in time. This is because the spreading codes used within a CDMA cell are orthogonal to each other, typically comprising, 64 or 256 chips which allow up to 64 or 256 subscriber terminals (or orthogonal combinations) within a cell.

In practical systems where a multipath environment exists, interference results from the existence of multipath components of a signal that are displaced in time and interfere with other signals. An Orthogonality Factor (OF) may be defined as a measure of how badly a multipath channel degrades the orthogonality of signals. An OF of zero means that the signals remain completely orthogonal whereas an OF of one means that orthogonality is completely lost. FIG. 2 shows signal components from subscriber terminals A and B on graphs showing signal power against time received. In FIG. 2a the signals are completely misaligned so that there is no orthogonality between these two channels (OF=1). FIG. 2b shows the situation where the larger signal component of channel B is aligned with one of the minor channel A signal components. This results in an improved OF of 0.85. FIG. 2c shows the situation where the main signal components of channels A and B are time aligned by offsetting the transmission timing of the terminal on channel B. This results in a further improvement with the orthogonality factor being 0.55. Because the time differences between the multipath components are dynamic in a mobile environment as described above, it is realistically only possible to align the strongest signal components for each channel. The propagation delay of the various multipath components is set by the spatial relation of the objects in the environment and is physically unalterable by the radio system. The Baines system achieves time alignment of the strongest signal components by instructing the various subscriber terminals to change their transmission timing, advancing or retarding it until the best (strongest) received signal components are aligned.

In applying this concept to the mobile environment, the critical factor is the rate of change of the multipath signal components. This rate is dependent on the motion of the subscriber terminal and the changes in the multipath propagation environment. In the TR25.854 proposal for USTS, the transmission timing is suggested to be adjusted in steps of $\frac{1}{8}$ chip (the chip period is about 260 nanoseconds) with a signalling interval of 200 milliseconds. At a rate of 100 km per hour, about the same speed as a vehicle travelling on an uncongested highway, a subscriber terminal is moving at approximately 27.7 meters per second. During the signalling interval of 200 milliseconds, the change in propagation delay due to the motion of the subscriber terminal is about 18 nanoseconds or $\frac{1}{14}^{th}$ of the chip period of 260 nanoseconds. It is therefore possible to track or compensate for these changes in timing using the proposed $\frac{1}{8}$ chip step size with a signalling interval of 200 milliseconds or less. When the subscriber unit is not moving directly away or towards the base station, the required timing compensation will be smaller.

In real multipath mobile environments however, individual signal components can suddenly vanish and others appear. These new components may be displaced in time by several micro seconds due to a significant change in signal path length for example due to the difference between a direct line of sight path and one reflected from a building. The tracking scheme discussed for the standard will be unable to keep up with changes of this magnitude, particularly as these changes may be relatively short lived in duration, perhaps only a few seconds.

The applicant has invested considerable research into measuring the characteristics of radio channels in a variety of multipath environments. A key discovery from these measurements is that the typical life of a multipath signal component is of the order of tens of meters in high scattering environments such as central London, England. This means that the main signal component will change for a position displacement of the mobile terminal (or an object moving in the environment) of the order of 10–100 meters. With a RAKE receiver, the life of a multipath signal component was calculated from a measured set of averaged power delay profiles where a moving average window was applied to remove fast fading. The median life of a component (expressed as distance) was 50 meters. In other words, the observation was that half the measurements had a life of less than 50 meters and half had a life greater than 50 meters. The maximum life observed was approximately 600 meters. The median life distance translates to a median lifetime of about 3.5 seconds at a speed of 14 meters per second or 50 kilometers per hour. At lower speeds the median lifetime tends to be longer. Depending on the multipath environment the worst case lifetime may only be one or two seconds.

From these measurements of a typical mobile system operating environment, it can be seen that any signalling control process to be used with a USTS mobile communication system must be able to control transmission timing every few seconds by typically 2 or 3 micro seconds, but possibly up to 18 micro seconds (70 chips). It is clearly not possible to do this with the tracking synchronous control process proposed in document TR25.854 as a 2 micro second timing change would require 60 $\frac{1}{8}$ chip tracking change commands signalled every 200 milliseconds which would take 12 seconds. As seen from the measurement information, this is typically longer than the signal component lifetime.

The invention therefore provides a method of determining a preferred or best signal component for each terminal, and signalling each terminal to optimise its transmission time to align these best signal components at the base station. The signalling being sufficiently fast for the high mobility environment. To control SCDMA operation in the event that there is a change in multipath component, a signalling command may be sent from the base station to the mobile terminal to adjust its transmission timing by an amount equal to the difference between the old and the new components as measured by the base station receiver. The command for a subscriber terminal to change its transmission timing by, for example, 2 micro seconds need only be sent every few seconds and this does not represent an undue burden on the subscriber terminal signalling channel. This is more than compensated for by the significant advantages of implementing USTS in a mobile environment described below with reference to FIG. 11.

Figure 3:
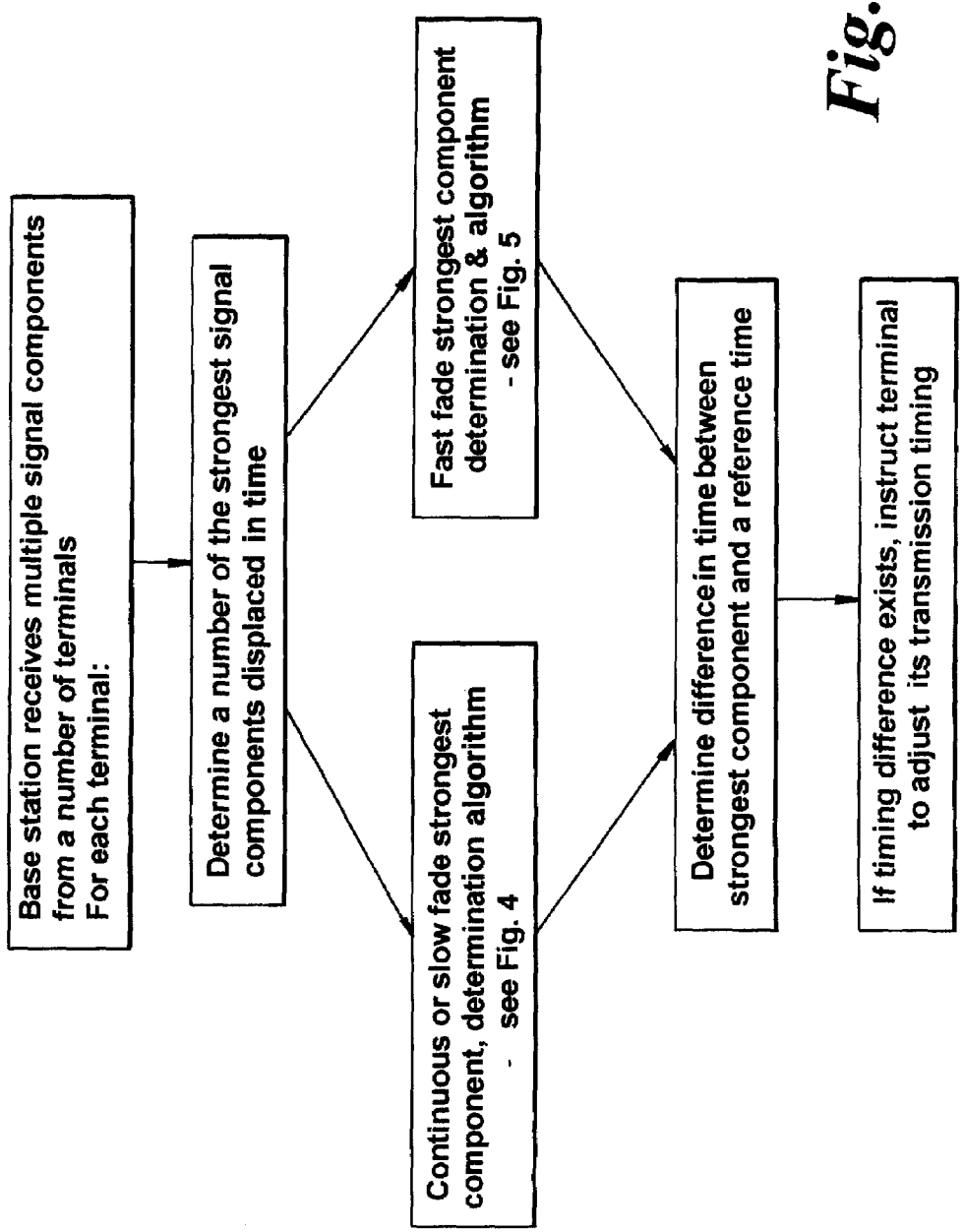
FIG. 3 is a flowchart of a method of operating a base station according to the present invention.

FIG. 3 shows a method of operating a base station 1 according to the present invention. Upon setting up a call with a subscriber terminal 2 or upon handover from an adjacent cell, the base station 1 receives a number of signal components displaced in time from a subscriber terminal. In a typical base station implementation, a RAKE receiver is used. The RAKE receiver is well known in the art and comprises a number of parallel code detectors, each with a different delay so that they pick up different copies or components of a signal delayed by an amount corresponding to their individual delay. The detected outputs are coherently summed to provide an improved signal output (as discussed in the previously referenced text "Principles of Mobile Communication" by Gordon L. Stuber, Kluwer Academic Publishers 1995, discusses RAKE receivers in chapter 8.3.1).

Using a RAKE receiver, a number of signal components are received on RAKE fingers within a delay window that encompasses the most significant signal components in terms of signal power received. The individual RAKE fingers are internally adjusted to correspond to the delays in signal propagation so that a number of the signal components can be received within the predetermined delay window on some, or possibly all, of the RAKE fingers. However because of the multipath delays in the environment, signal components on other channels can interfere with the wanted channel. As already described, this interference may be minimised by time aligning the strongest signal component for each mobile terminal to be received. Information from the RAKE receiver may be used to measure the timing adjustments needed to align the transmissions. The RAKE receiver is configured to use a searching finger which adjusts its delay in a periodic manner to detect new signal components of a minimum signal strength. For example the RAKE receiver may have four "fixed" and one search finger such that the four fixed fingers are locked onto the four highest signal strength signal components whilst the search finger looks for higher strength components. If one is found one of the fixed fingers (typically the one supporting the weakest component) has its delay adjusted to correspond to the new component.

The RAKE receiver assigned to each mobile terminal will isolate a number of signal components delayed in time by varying amounts for that mobile terminal so that it is possible for the base station to determine the strongest multipath component for that mobile terminal and also its time delay relative to a reference time. This reference time may be a predetermined timing reference (i.e. universal time as may be determined from the Global Positioning System (GPS) of satellites) or set by the timing offset of another subscriber terminal's best (strongest) signal component, or set by the timing of one of the clock signals that may otherwise be present in the base station. In general any time reference available within the base station may be used. The timing difference between a particular mobile terminal's strongest received signal component and the reference time can then be calculated. The subscriber terminal can then be instructed to adjust its timing by the required difference to bring its transmissions into alignment.

Alternatively the difference between the current strongest received signal component and a new one can be used to adjust the transmission timing of a terminal.

Figure 5:
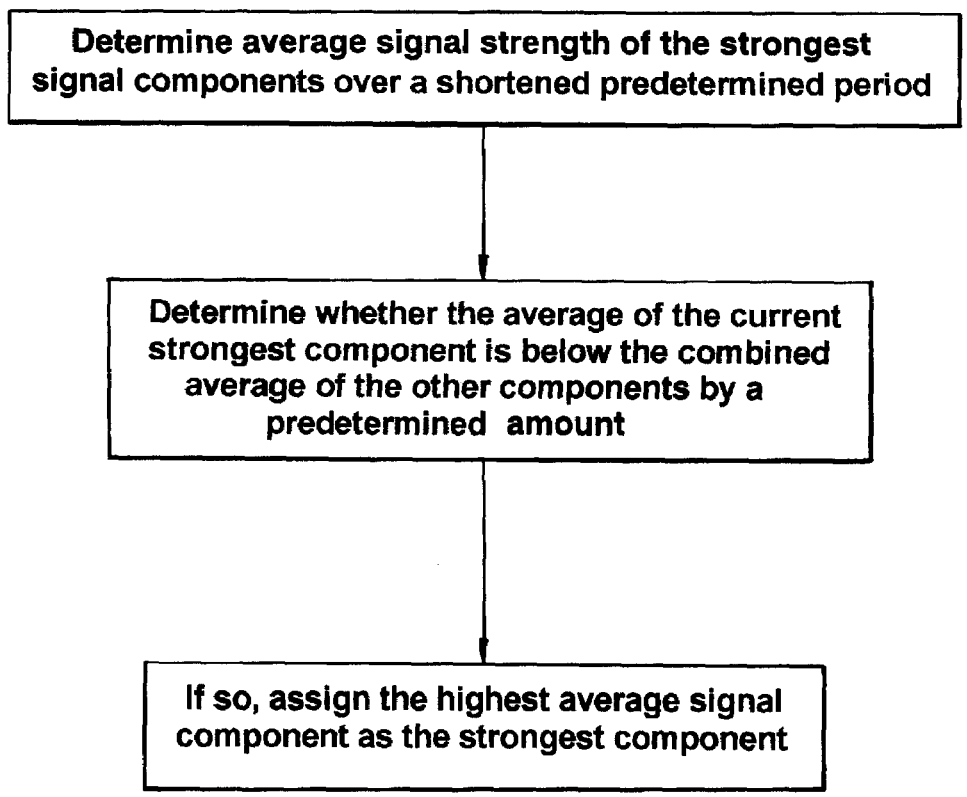
FIG. 5 is a flowchart of a method recovering from fast fading of the strongest signal component.

Given the highly dynamic nature of the multipath environment in a mobile communications system, a preferred method of determining the strongest signal component is described with reference to FIG. 5. For each signal component received for a particular mobile terminal, the average signal strength over a predetermined time interval, for example 100 milliseconds, is measured and stored. If there is a change in average signal strength of a component such that it exceeds the average of the currently synchronised component by a predetermined threshold, for example 3 dB, and this component is also offset in time by more than a threshold, for example 2 chips, then this should become the new synchronised signal component. The mobile terminal will then be signalled to adjust its timing to correspond to the new component.

The process described above is suitable when the components vary in strength continuously. However, in the event that a signal component, for example the currently synchronised component, disappears as a result of rapid shadowing, more rapid action is required to select a new component. A preferred method for this is shown in FIG. 5 and also compares the strength of the currently synchronised component averaged over a short interval, for example 10 milliseconds, against the average of the three strongest other components. If the synchronised component is below the average by a predetermined threshold, for example an amount exceeding twice the standard deviation of the measurements, then the synchronised component may be assumed to have faded and must be immediately replaced with the currently strongest component selected from the three strongest other components used in the averaging.

Other considerations can be factored into this calculation. Knowledge of the type of radio propagation channel, for example outdoor-indoor, pedestrian, vehicular or urban, may be used to alter the timing parameters of the component selection process. The thresholds for changing components can be modified depending on, for example, the standard deviation of the measures of the signals. The standard deviation, in this use, may be considered to provide a measure of the inherent uncertainty in the signals and thus may be used to segregate changes in the measurements that require no action from those which do indicate a needed change. The threshold can be set at twice the standard deviation of the measurements to allow the selection process to adapt to the changing propagation conditions. Also, for example, mobiles in indoor locations or an urban pedestrian environment, would have a lower averaging interval but higher component signal strength switch thresholds as they are operating in a high scattering environment. Mobiles in a vehicular rural environment might increase the component averaging time to span the effects of repetitive fading due to rapid motion and to use a tracking step size suited to the change in timing due to motion.

In addition to compensating for dynamic multipath component signal strength, the base station is preferably arranged to compensate for time alignment drift in a best (strongest) signal component due to movement of the mobile subscriber terminal or a nearby reflecting object by determining timing errors in that signal component.

These timing drifts or errors vary relatively slowly and can therefore be compensated for by a tracking process. The tracking commands will typically be sent regularly to advance or retard the subscriber terminals transmission timing by a predetermined step size to accommodate for small signal timing errors detected by the base station. The step size of the tracking commands can be adjusted, for example, dependent on the measured speed and location of the subscriber terminal. The location of the mobile may be determined from the location service available as part of the mobile communication system. In some systems, for example, GPS is used to measure the terminal's location and rate of motion. Mobiles that are moving swiftly may be signalled to compensate with a larger step size for their more rapid motion. Similarly, mobiles whose location is indoors may have a lower averaging interval but higher threshold due to their high scattering environment. The step size may be selected based on past history of motion, the velocity and known location of the subscriber terminals. For example, fast moving subscriber terminals utilise a larger step size than stationary or slow moving subscriber terminals.

A method for standardising the uplink timing alignment signalling commands for third generation SCDMA mobile systems, is now described with reference to FIG. 6.

Figure 6A:
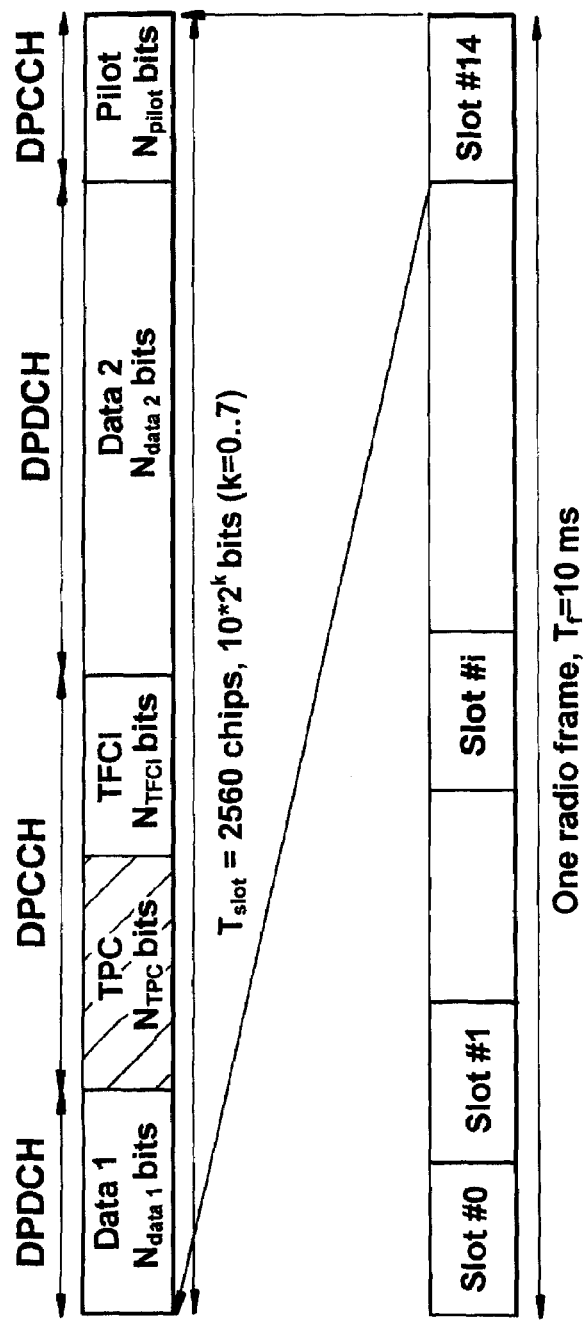

The arrangement of the downlink dedicated physical channel in the 3GPP standard is shown in FIG. 6a. Further details of the channels used in the 3GPP standard can be found in the document "3GPP TS 25.211 V3.6.0 (2001–03) Technical Specification 3rd Generation Partnership Project; Technical Specification Group Radio Access Network; Physical channels and mapping of transport channels onto physical channels (FDD)". This standard defines a 10-millisecond transmission frame that is divided into 15 slots. The frames are numbered by the Connection Frame Number (CFN). The CFN is initialised when the radio link is established and incremented once each 10 millisecond frame. The CFN has a maximum value of 255, and when the count increments past this it is reset to zero to being counting again.

In each of the slots in each frame a sequence of data bits (DPDCH), control channel bits and pilot bits (DPCCH) are transmitted. The time alignment commands (TAC) are sent by making additional use of the power control command field of the DPCCH. The power control command is sent in the DPCCH sequence. By replacing the TPC symbol in slot #14 in each frame, a sequence of Time Alignment Bits (TAB) may be sent. A sequence of 15 Time Alignment Bits are sent over a 150 millisecond interval to form a coded Time Alignment Command (TAC). The beginning bit of each command would be transmitted at the frame for which the CFN mod 15=0. This defines the beginning of a 15 frame sequence for the 15 TABs. As will be known to those skilled in the art, the TPC in the 3GPP standard is not always a single bit but is sometimes encoded into several bits. However using the standard it is possible to replace the TPC "bit" in each frame with an equivalent TAB.

The command is coded with a forward error correction code to increase the reliability of transmission by allowing the correction of transmission errors. The use of a (15,8) block error-correcting code as discussed in the text by Mischa Schwarz "Information Transmission, Modulation and Noise" McGraw Hill Book Company 1980, Chapter 6–8 is a suitable coding scheme. This code, for example, has the advantage that it allows two transmission errors to be corrected. As the individual TAB are repeated in some of the DPCCH spreading code combinations used in the 3GPP system, there is additional error correction capability beyond that of the (15,8) error correcting code.

The placement of the TABs as part of the DPCCH is preferred as it allows the time adjustment commands to be readily sent directly from the base station (in layer 1) without the need to request that (layer 2) messages be sent by the associated base station radio network controller unit. This reduces the complexity of the implementation and reduces delay in sending the time alignment commands.

Figure 6B:
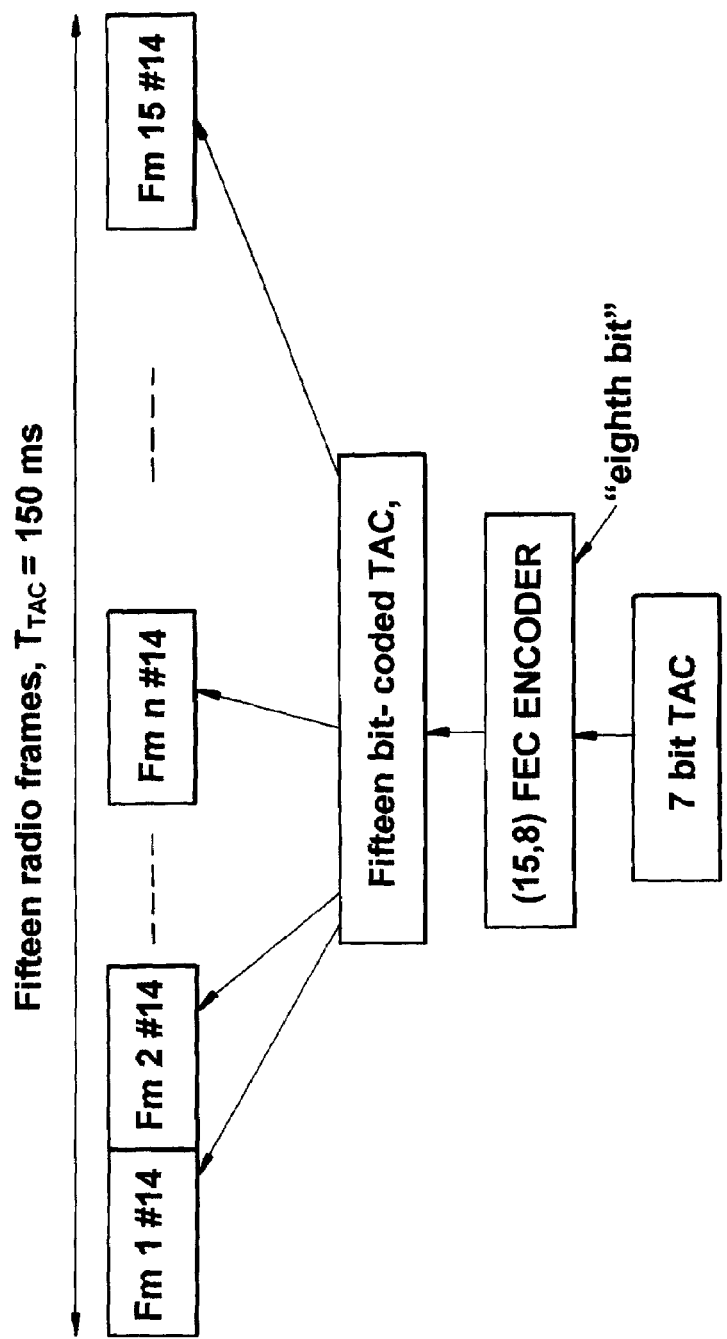

The transmission of the Time Alignment Command is illustrated in FIG. 6*b*. The command consists of a 7 bit TAC and an "eighth bit". The usage of these bits and their meaning is explained later. These 8 bits are coded using a (15,8) FEC encoder for the forward error correcting code previously mentioned. The 15 bits of the coded TAC are then punctured into the TPC power control symbol in slot 14 in a succession of 15 frames with the first bit of the coded TAC being transmitted in the frame where the CFN mod 15=0. This provides a capability to send an eight bit time alignment command to the mobile unit within an interval of 15 frames, or 150 milliseconds, in the 3GPP system. As was indicated earlier herein, this rate is sufficient to track changes in time alignment due to motion of the mobile terminal, and also provides a rapid means to send a command to adjust to a new component.

An arrangement of suitable Time Alignment Commands sent in this manner is given in FIG. 6*c*. This table defines a basic set of commands that may be extended for further operations. A brief note on the operation of each command is given in the following. This table illustrates the 7 bit TAC. The individual bits of the command are used to adjust the timing of the mobile units transmission. One bit of the TAC (illustrated here as the most significant bit) is a "direction command" used to indicate a command to either advance or retard of the mobile unit's transmission timing. If the bit is a zero, the timing is advanced, if the bit is one, the timing is retarded. (Of course other bit positions could be used, the principle being applied is that one bit of the command is used to denote an advance or retard of the timing.)

The remainder of the bits in the TAC are used to denote the magnitude of the timing correction to be applied. These bits are used in a weighted summation technique to define the desired amount of timing correction. There are six bits used to denote the correction magnitude. Each of these bits has a weighting denoted by an entry in a table that may be shared between the base station and the mobile unit. If a table is not used, default weightings for the table are illustrated in FIG. 6*c*. These weightings indicate that the rightmost bit (least significant) is used to denote the smallest correction weighting of ¼ microsecond or the default of ⅛ chip if in tracking mode. The next bit ("next to least significant") denotes a weighting of ½ microsecond. The next has a weighting of 1 microsecond, the next has a weighting of 2 microseconds, the next has a weighting of 4 microseconds, and the next (the most significant bit) has a weighting of 8 microseconds. If no bits are set, or only the most significant advance/retard bit is set, then the mobile makes no correction to its timing. With this arrangement, if bits are set in the appropriate combination, the base station can command a correction of any value up to 15.75 microseconds with a resolution of ¼ microsecond. This spans the range of typical changes in component timing observed in field measurements. The mobile can thus very quickly be adjusted to within half of this, or ⅛ microsecond of exact synchronisation, and from there the tracking commands can be used to align the transmission timing more exactly. For example, a TAC of 1011011 would cause the mobile unit to retard its transmission timing by 6.75 microseconds using the default table values. The table values may be altered through exchange of signalling messages between the base station and the mobile unit to allow other adjustment ranges, either larger or with more resolution, or with non-linear weightings of the adjustments. These alternate weightings may be chosen to suit special propagation conditions.

The "eighth bit" may be used for additional timing command functions. This additional functionality may be set between the base station and the mobile unit through exchange of signalling messages. One of these functions that may be preferred is to use the eighth bit to scale the correction weightings. With the eighth bit zero, the standard weightings would be used (i.e. as described above with a ¼ microsecond resolution). If the eighth bit was set, the weighting of the bits would be divided by two. This would permit a correction of only up to 7.75 microseconds but to a resolution of $⅛^{th}$ microsecond. In tracking mode the eighth bit would also have the effect of increasing the tracking step size to ¼ chip. This altered weighting may be suitable for typical indoor environments, while the regular weighting may be suitable for outdoor environments for the mobile unit. The eighth bit could alternatively be used to select one of two tables to be used for the weightings. This alternative meaning would enable a different table to be used for different conditions, for example, between vehicular mobility and pedestrian mobility.

The function of the least significant bit may preferably be designed to have a double meaning. If the least significant bit is the only bit of the 6 weighted bits to be set, then the correction would be that of the default tracking adjustment (typically $⅛^{th}$ chip). The advance retard direction of the timing adjustment would of course be denoted by the most significant bit, and the eighth bit, if set would cause the tracking correction to be multiplied by two (or a default of ¼ chip). However, if the least significant bit is set in combination with a non-zero setting of one of more of the 5 other weighted bits, then the least significant bit would have a weighting of ½ of the next to least significant bit (or ¼ microsecond in the default case). This arrangement allows the direct setting of the timing adjustment to within about ½ chip time for the 3GPP system (¼ microsecond or 250 nanoseconds is about the same as the chip duration of 260 nanoseconds used in the 3GPP radio system).

To jump to a new timing alignment, the mobile unit would be sent a combination of jump and tracking commands. The first sent command would move the alignment to within plus or minus 125 nanoseconds of the desired alignment. Subsequent tracking commands, making use of the setting of the eighth bit to choose between ¼ and ⅛ chip steps, would bring the alignment to within ⅛ chip. Typically, such alignment will be achieved with two commands and an elapsed time of 300 milliseconds. While it is preferable to maintain the alignment to within ⅛ chip to minimise the interference, some benefit of time alignment synchronisation is achieved even with ¼ chip alignment error.

Figure 6D:
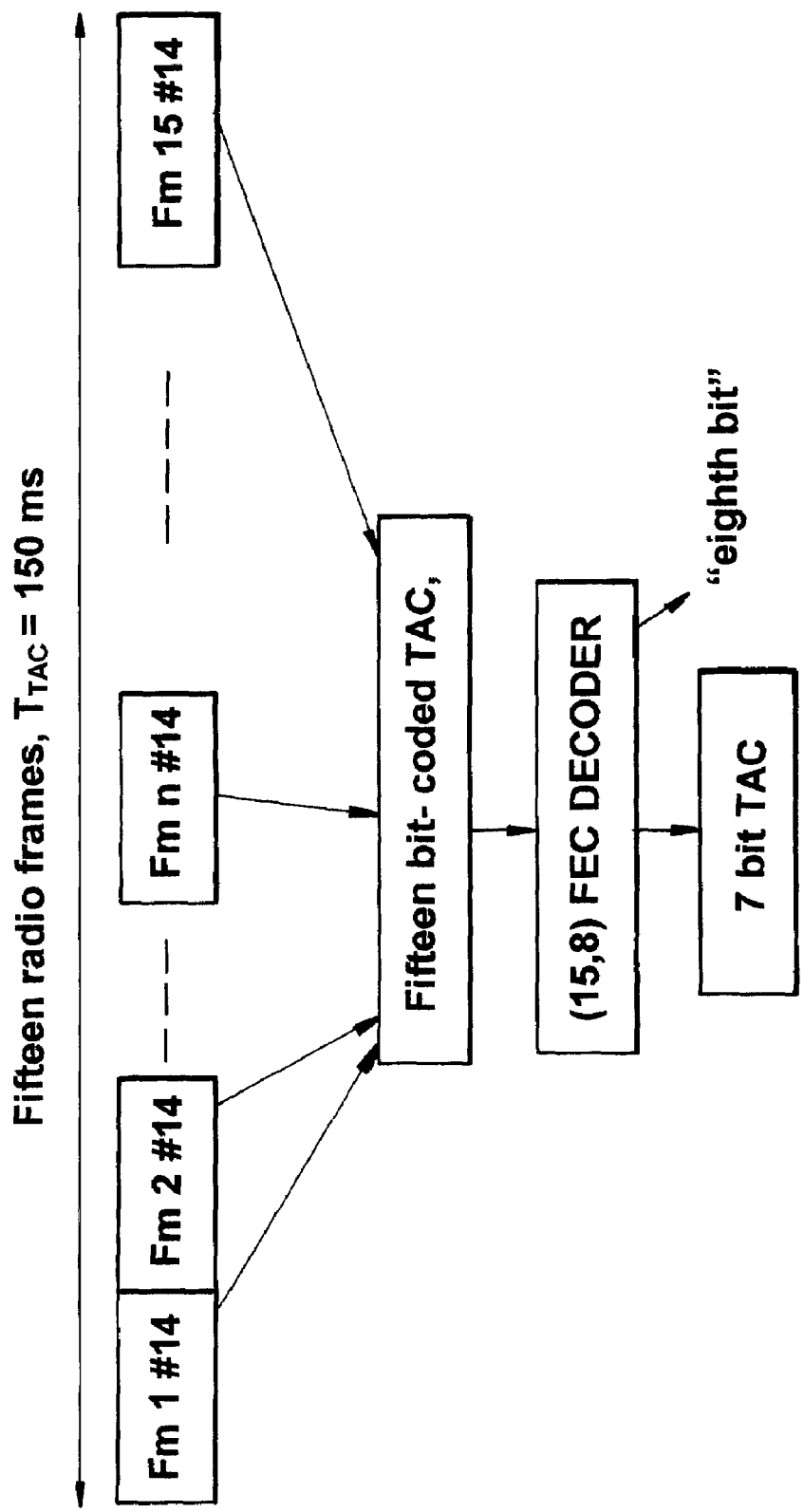

The decoding process for the TAC bits is illustrated in FIG. 6d. The coded time alignment command is received at the mobile unit by separating the TABs from slot 14 of a sequence of 15 frames beginning with the frames for which the CFN mod 15=0. These 15 coded bits are then decoded by a (15,8) decoder to become the seven TAC bits and the "eighth bit". These bits are then used by the mobile unit to adjust its timing according to the meaning of the bits described earlier herein.

If the FEC decoder detects an un-correctable error, the mobile unit would not adjust its timing unless the previous command had been received correctly and was a tracking command (only the least significant weighted bit set). In this case, the last tracking command would be repeated.

The above description is a preferred method which is an example of a basic process in which the time alignment command is assembled, coded to protect against errors, transmitted from the base station to the mobile through the use of layer 1 signalling symbols over a series of frames, received as a sequence at the mobile unit, and decoded to form a command that is used to adjust the timing of the mobile's transmissions. Other coding for the time adjustment commands, forward error correcting coding, and puncturing of the encoded bits may alternatively be used. In the preferred method "large" time alignment commands are combined with the "smaller" tracking commands, although methods are envisaged where these can be separated.

Figure 4:
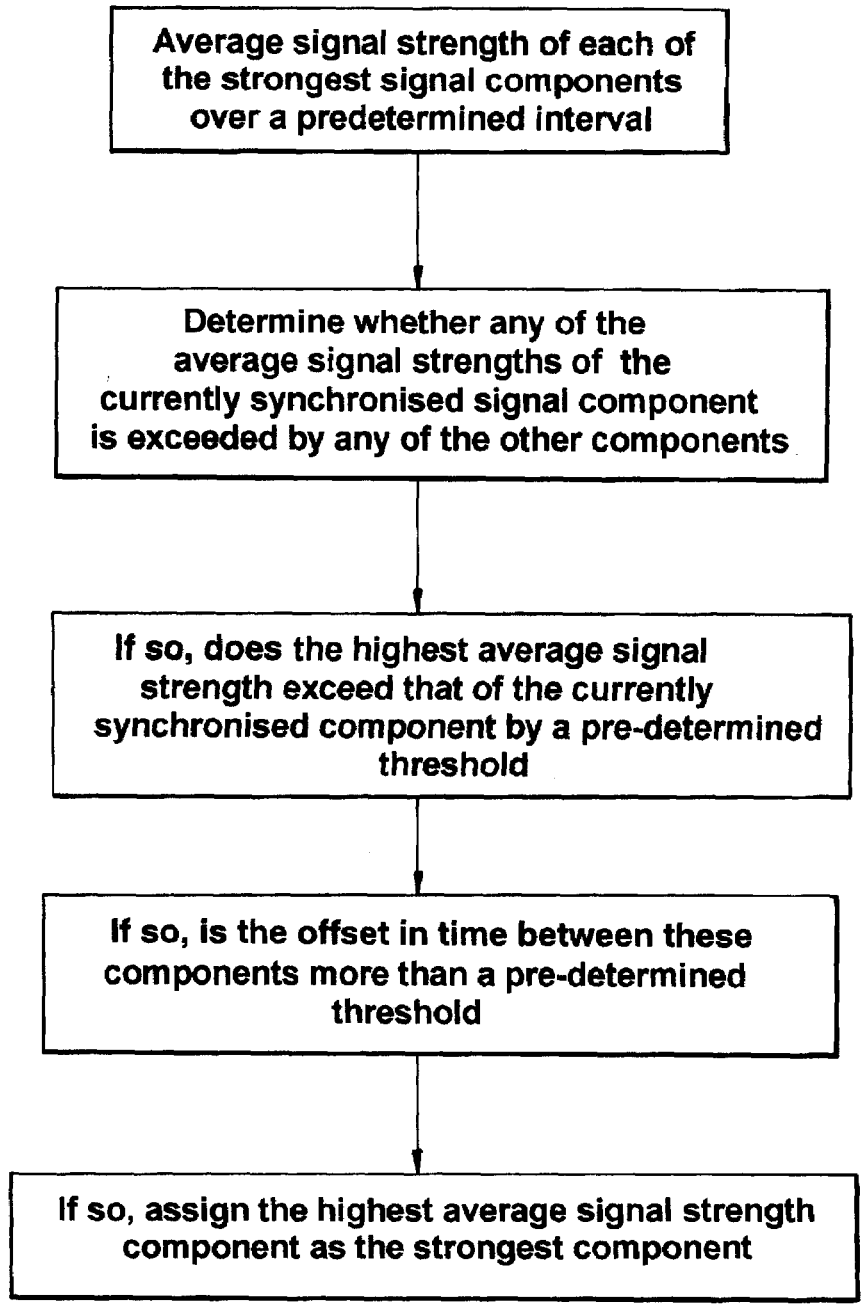
FIG. 4 is a flowchart of a method of determining the strongest signal component.
Figure 7:
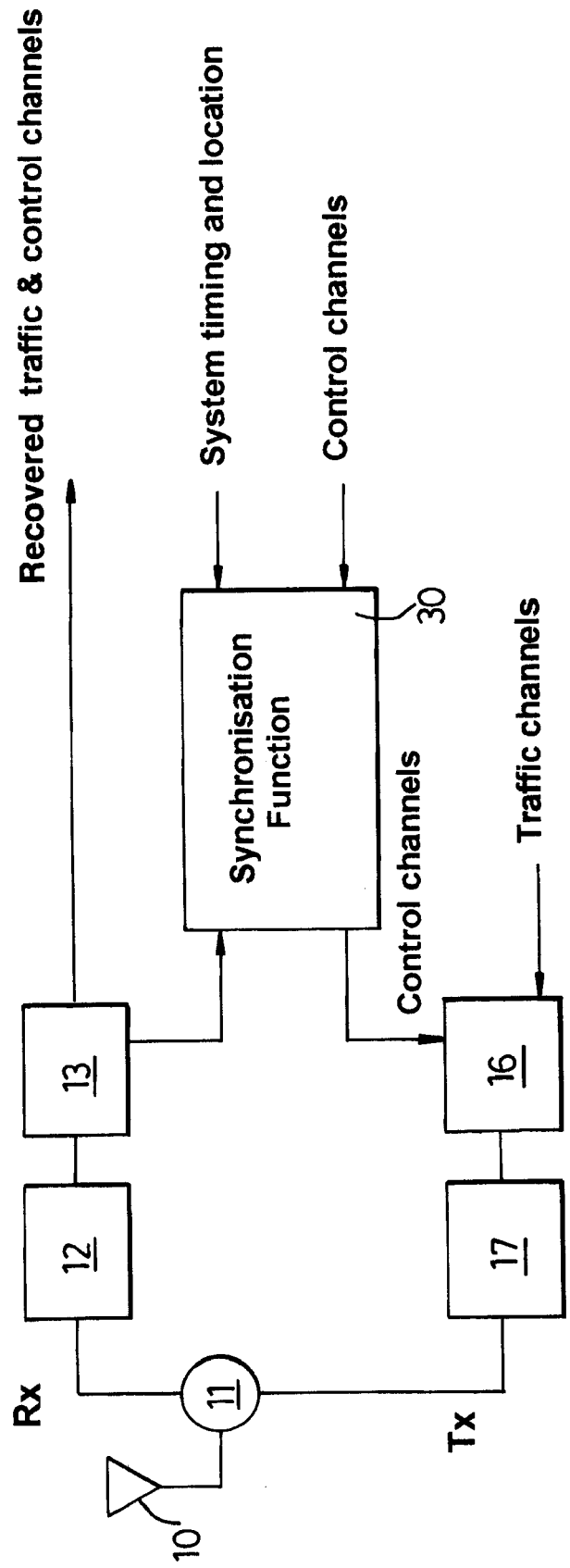
FIG. 7 show a schematic block diagram for a base station according to the present invention.

A functional block diagram showing a preferred architecture for the base station is shown in FIG. 7. The base station architecture 1 comprises an antenna 10 coupled to a duplexer 11 which is coupled to a receiving chain (Rx) comprising a radio frequency conversion stage 12, and a RAKE receiver 13, which recover the traffic and control channels transmitted by the subscriber terminal 2. The duplexer 11 is also coupled to a transmission chain (Tx) comprising a radio frequency conversion stage 17 and a CDMA coding stage 16 which codes incoming traffic and signalling channels to be transmitted to the subscriber terminals 2. The base station 1 also comprises a synchronisation function 30 according to the present invention which receives measurements of the timing offsets of the received signal components from the RAKE receiver 13 as well as system timing and location data from other parts of the base station. The system timing information, may be the universal time (i.e. as available from a GPS receiver) if the base stations are synchronised between cells or simply a suitable framing time signal used for other purposes within the base station. The UMTS standard 10-millisecond frame time interval could be used. Location information may come from a location service that is otherwise part of the mobile network. This location information may be processed to determine the propagation conditions that affect the synchronisation function, for example the location of the mobile unit as indoors, outdoors, pedestrian or suburban, urban environments. The synchronisation function processes the input measurements, location and timing information to compute the necessary synchronisation adjustments as shown in FIGS. 3, 4 and 5, and adds the necessary synchronisation signalling control commands into the downlink signalling channel as shown in FIG. 6, for transmission to subscriber terminals.

Although this illustration (FIG. 7) shows a typical base station configuration utilising a single antenna and a duplexer, the invention is equally applicable to base station configurations that may use separate transmit and receive antennas without a duplexer element. Similarly, although the synchronisation function is shown as part of a typical base station including both the transmit and receive apparatus for communication with the mobile, alternate configurations may also be used with the synchronisation apparatus in which, for example, the traffic and signalling transmitted to the mobile may occur through a transmitter unit that is not co-located with the receiver apparatus of the synchronisation function. Such distributed operation may occur, for example, in a CDMA system operating in soft handover mode.

Figure 8:
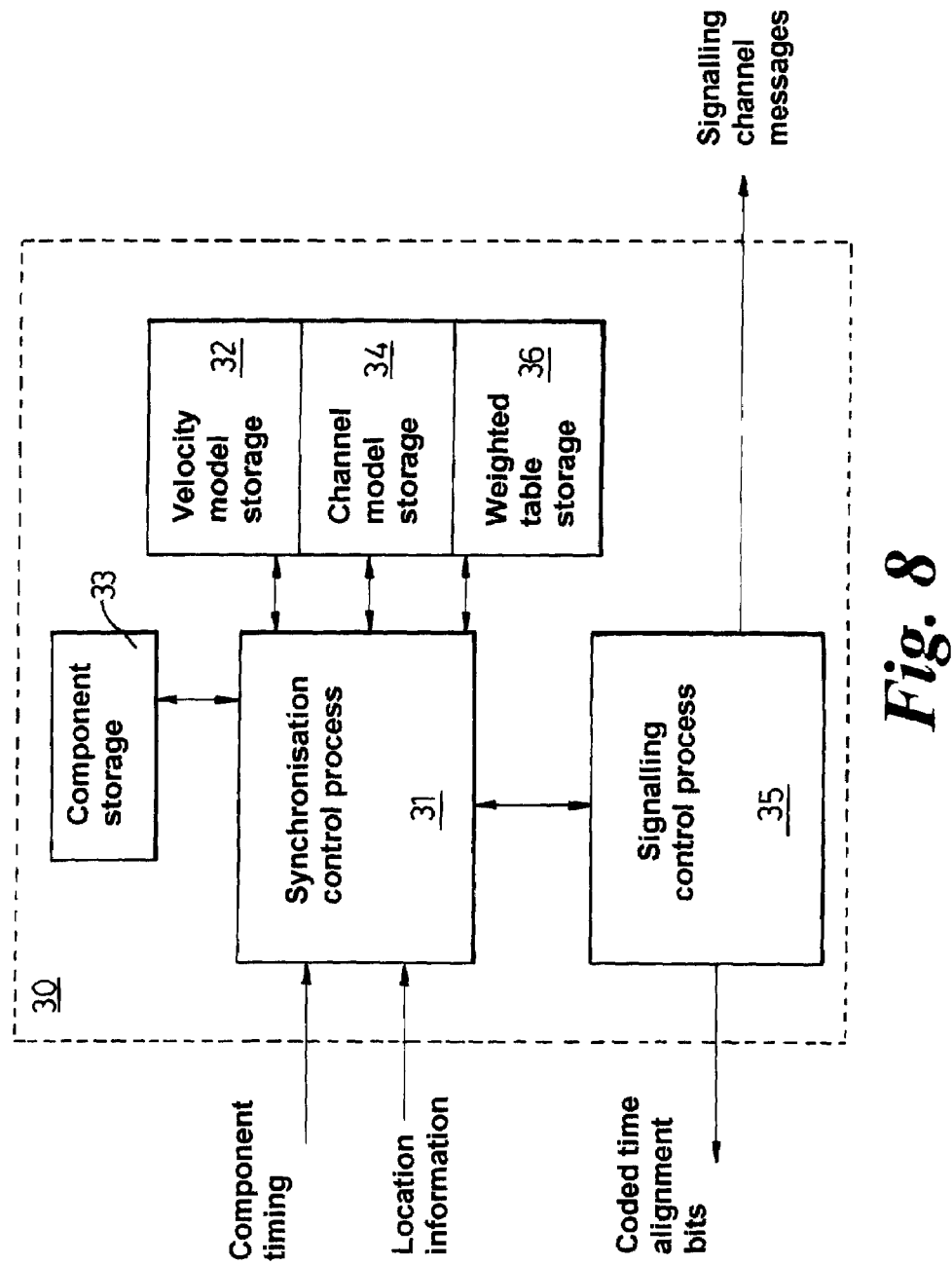
FIG. 8 shows a schematic block diagram for the synchronisation function for the base station of FIG. 7.

FIG. 8 shows a more detailed schematic of the synchronisation function 30 which comprises: a synchronisation control process 31 with associated velocity model storage 32, component storage 33, channel model storage 34 and weighted table storage 36; and a synchronisation signalling process 35.

The synchronisation control process 31 receives multi-path component timing inputs from the RAKE receiver 13. The RAKE receiver provides a measure of the time difference between the received components for the received signals for each mobile and the system reference time. Location information may also be received concerning the location of the mobile terminals and this may be processed as discussed earlier to provide suitable propagation models and threshold and timing parameters for the synchronisation control of the mobile terminal. The location information may be used by the Synchronisation control process 35 to select from its velocity storage unit and channel model storage unit, parameters suitable for adjustment of the timing for the current location of the mobile. This may include previously derived adjustment rates and adjustment tables for environments such as urban, rural, indoor, vehicular mobile, pedestrian or stationary. In the weighted table storage, the synchronisation control process will maintain the weights for the mobiles under its control that differ from the default values.

The synchronisation control process 31 will combine this information to calculate the necessary timing adjustments for each mobile under its control. The RAKE receiver timing inputs for each mobile unit are received on a regular basis from the receiver and compared with the current synchronised component and the averages of the previously received components stored in the component storage 33. Preferably the method of FIGS. 3, 4 and 5 are implemented. If there is no change, the control process can indicate to the signalling process to send a "do nothing" TAC. If there is a change, due to motion requiring a tracking update, the control process 31 can indicate to the signalling process 35 to send a "tracking" TAC with the appropriate direction and scaling on the eighth bits as discussed earlier herein. If there is a need to adjust the timing to a new component due to fading of the previously synchronised component, the control process 31 can select the new component, based on the recent measurement and its storage of past behaviours and the location region of the mobile, calculate the necessary timing correction (in microseconds) and indicate to the signalling process 35 to send a "timing adjustment" TAC with the appropriate direction and scaling of the weights using the eighth bit. The synchronisation control process 31 performs this function for each of the mobile units under its control. The mobile units under its control will be determined by other parts of the base station and indicated to the control process 35 through the provision of RAKE receiver information as well as information to the signalling process on which DPCCH to insert the TABs.

The signalling control process 35 receives the adjustment requests from the synchronisation control process 31 and selects the correct combination of weighted bits, direction and eighth bit command, performs the forward error correction encoding and inserts the encoded command into the DPCCH for each mobile under synchronisation control. In the event that the synchronisation control process decides to change the table of weights in the mobile unit as discussed earlier herein to accommodate changes in the operating propagation environment of the mobile unit, these signalling messages would be sent to the signalling channel message processor in other parts of the base station or its associated radio network controller to be inserted into the stream of signalling messages for the mobile unit.

Figure 9:
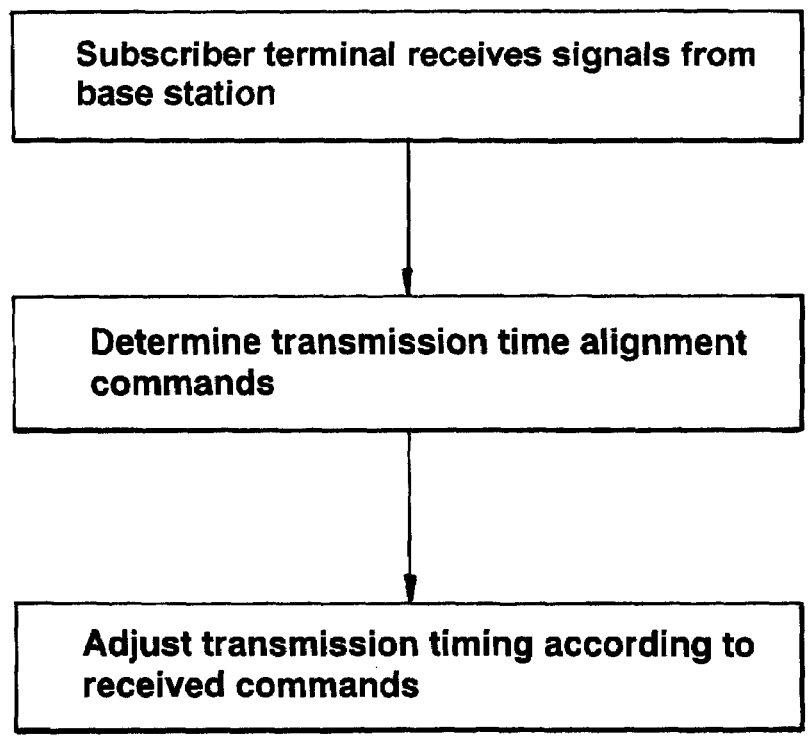
FIG. 9 is a flowchart of a method of operating a subscriber terminal according to the present invention.

FIG. 9 shows a method of operating the subscriber terminal 2 according to the present invention. The terminal receives signals from the base station 1, decodes signals intended for that terminal and extracts synchronisation timing alignment commands TACS as shown in FIG. 6*d*. The tracking commands are used to adjust the local clock by the previously determined step size (i.e. $\frac{1}{8}^{th}$ chip time as previously herein discussed). The timing adjustment commands as discussed previously herein may also be received and would be used to offset the timing of the mobile's transmissions according to the process outlined in FIG. 3. Other signalling messages that are part of the synchronisation process for the terminal may be received via standard layer 2 messaging. This could include commands to adjust the step size for tracking or to change the table of predefined weighted corrections. The terminal may receive additional requests related to its synchronisation. The synchronisation control system may request the terminal to report a measure of its timing in relation to timing markers that it receives in the downlink transmissions from the base station. The base station may use this information to help compute the location of the terminal as this measures the propagation delay of the radio signals to the mobile terminal. These measurements may already be part of the existing location service that is part of the mobile system.

Figure 10:
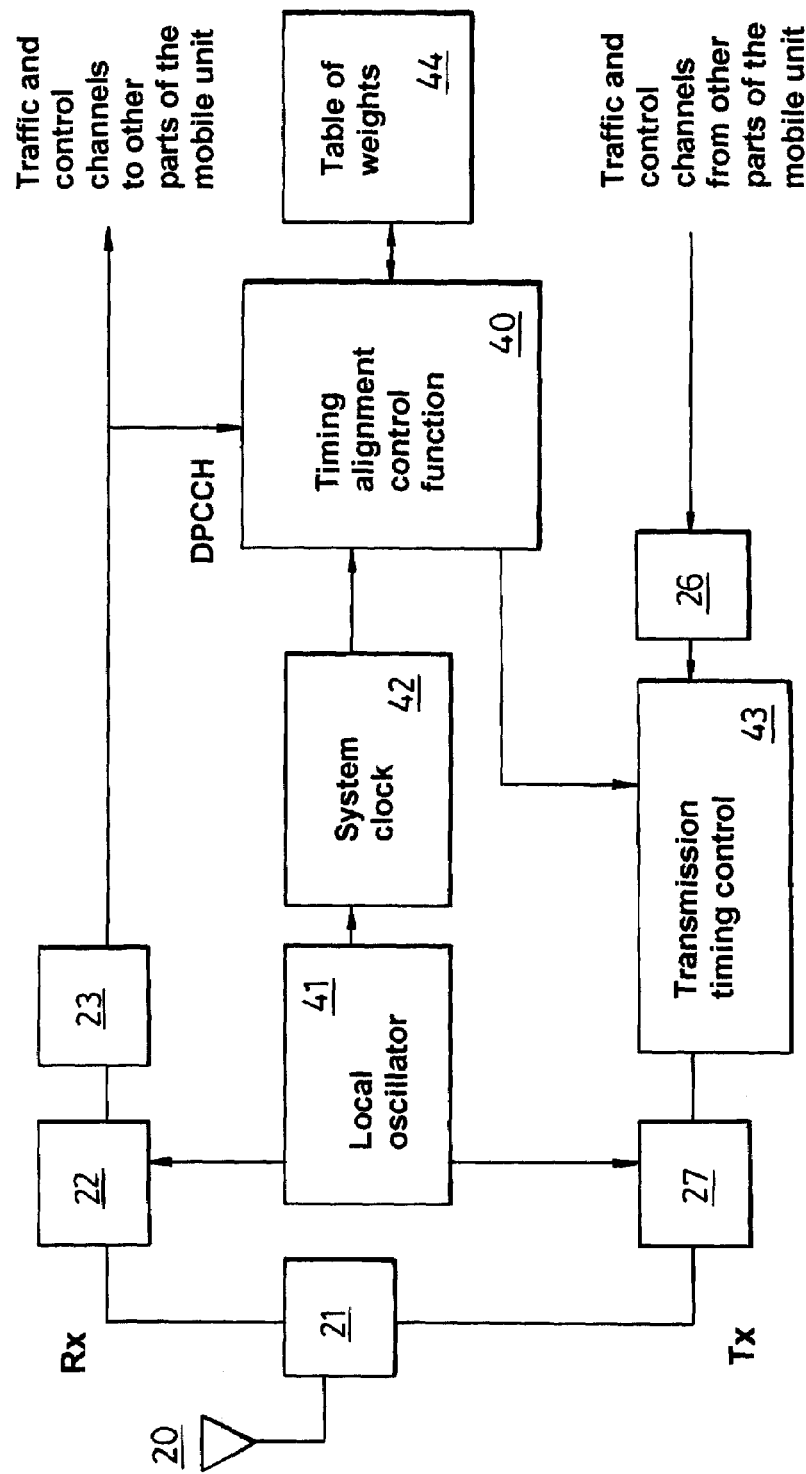
FIG. 10 is a schematic block diagram for a subscriber terminal according to the present invention.

FIG. 10 shows a schematic diagram of a subscriber terminal 2 to illustrate the means of implementing the invention. This is analogous to the base station 1 architecture and comprises an antenna 20 coupled to a duplexer 21 which is coupled to a receiving chain (Rx) comprising a radio frequency conversion stage 22, and a RAKE receiver 23, to recover traffic and control signalling from the base station 1. The duplexer 21 is also coupled to a transmission chain (Tx) comprising a radio frequency conversion stage 27 and a CDMA coder 26 which encodes traffic and signalling from the subscriber terminal for transmission to the base station 1. (It should be noted that the analogous RF components (21, 22, 23, 27) in the mobile unit are operating at different radio frequencies than the comparable units of the base station. In the mobile unit, the Rx chain operates at the same frequency as the base station's transmitter, and the Tx chain in the mobile unit operates at the same frequency as the base station's receiver.)

The subscriber terminal 2 also comprises a transmission timing alignment function 40 which interprets control messages recovered from the DPCCH transmitted from the base station 1 and which controls the transmission timing of the subscriber terminal 2. As discussed above this is to provide for time alignment of the strongest multipath signal component received by the base station 1 with those of other subscriber terminals 2. The transmission timing alignment function 40 is coupled to the local clock function 42 and 41 and adds or subtracts timing offsets to the timing reference signal to alter the transmission timing.

The transmission timing control unit 43 of the mobile transceiver is instructed by the timing alignment function 40 to adjust the transmission timing in response to TAC received over the DPCCH as discussed previously herein. The transmission timing control unit 43 is typically already part of the mobile transceiver for other purposes in the radio system operation. Its operation to support the synchronous CDMA may involve extension to accommodate a range of changes in timing spanning from $\frac{1}{8}^{th}$ chip to 16 microseconds. Associated with the timing alignment function 40 is the table of weights 44, and example of which is given in FIG. 6*c*. This table, as discussed previously herein, has 7 entries holding the weight of timing offset to be added to the timing correction according to the weight bits received in the TAC. In the default case, this table includes the values (starting with the zeroth entry) $\frac{1}{8}^{th}$ chip, $\frac{1}{4}$ microsecond, $\frac{1}{2}$ microsecond, 1 microsecond, 2 microseconds, 4 microseconds and 8 microseconds. These values may be used by the timing alignment function 40 to calculate the timing correction to be given to the transmission timing control unit 43 to align the timing according to the instructions received in the TAC from the base station. The table of weights 40 may use the default values (such as those indicated) or the table may be loaded with other values under instruction from the base station using signalling messages that are otherwise part of the radio communications system. The alternate values of the table of weights 40 may better adapt the timing control process to the propagation environment of the mobile unit.

The synchronisation function 30 of the base station and timing alignment function 40 of the terminal can be implemented as software algorithms performed by a micro controller, as an ASIC, or as a pre programmed programmable logic device. In a typical preferred arrangement for the mobile terminal, the decoding of the signalling and the time alignment control process would be performed by the micro controller already available in the terminal for controlling other terminal functions. This micro controller would alter the transmission timing by interacting with the other parts of the apparatus that set the transmission timing. In many terminals such apparatus may already exist as a means to adjust the round-trip-signalling time to the terminal. In the base station, the synchronisation control process would preferably be implemented in software operating in the micro controller already available in the base station for control of its operations. This micro controller would interact with apparatus including the timing measurements apparatus of the RAKE receivers to track the received timing of the signals. The timing reference information preferably will typically already be connected to the RAKE receivers to enable their measurements to be made with respect to the system time. If this is not the case, an additional circuit (ASIC) may be added to allow the RAKE timing to be referenced to the system reference time.

The invention is equally applicable to TDD and FDD SCDMA applications. In the case of the TDD operation of CDMA systems, the synchronisation is made with respect to the uplink burst time frames. The synchronisation process in the base station for TDD would instruct the mobile terminals to adjust the starting time of their uplink bursts and their CDMA orthogonal codes so that all signals from the terminals arrive coincident at the base station (and thus will be orthogonal).

Figure 11A:
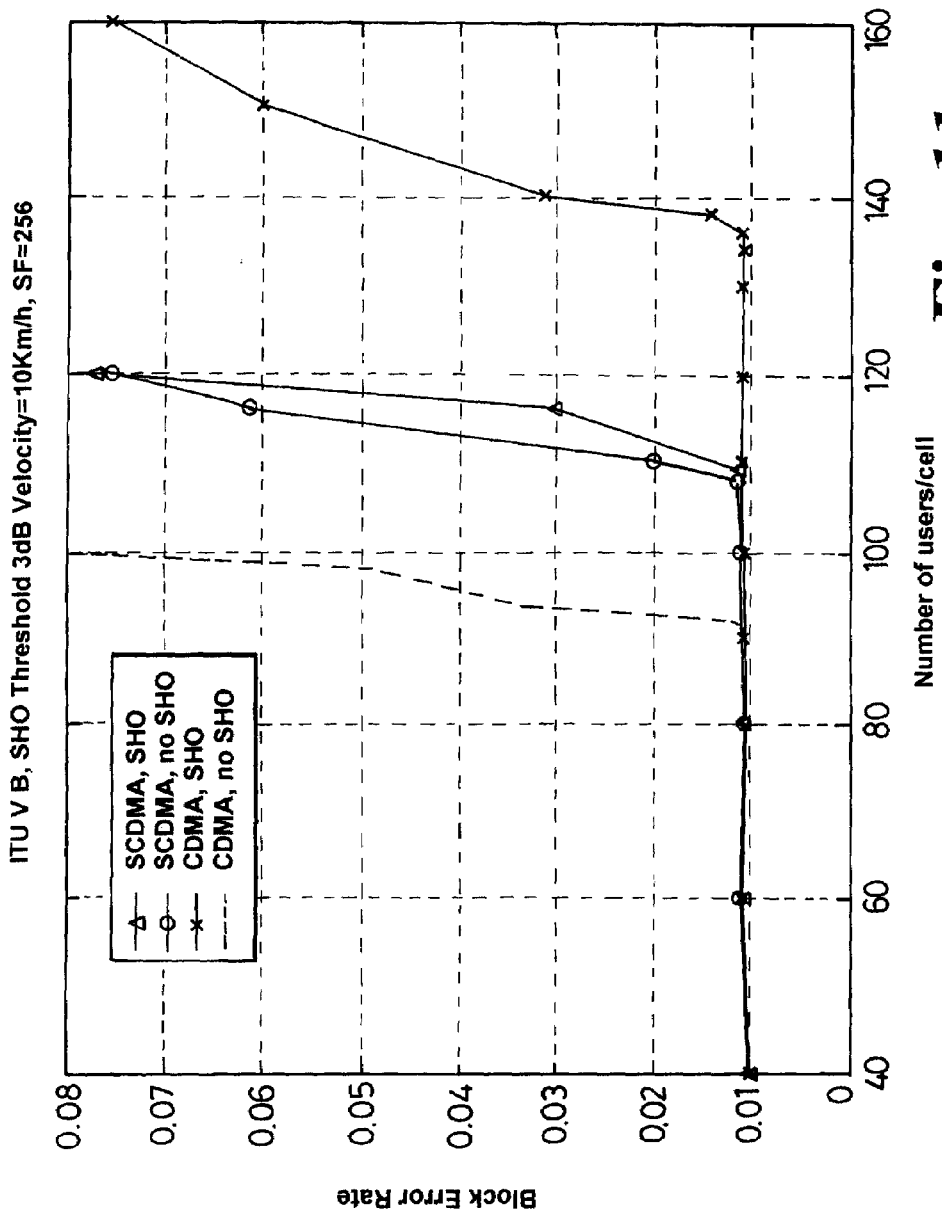
FIG. 11a shows BLER simulated performance results for SCDMA ITU vehicular B channel.
Figure 11B:
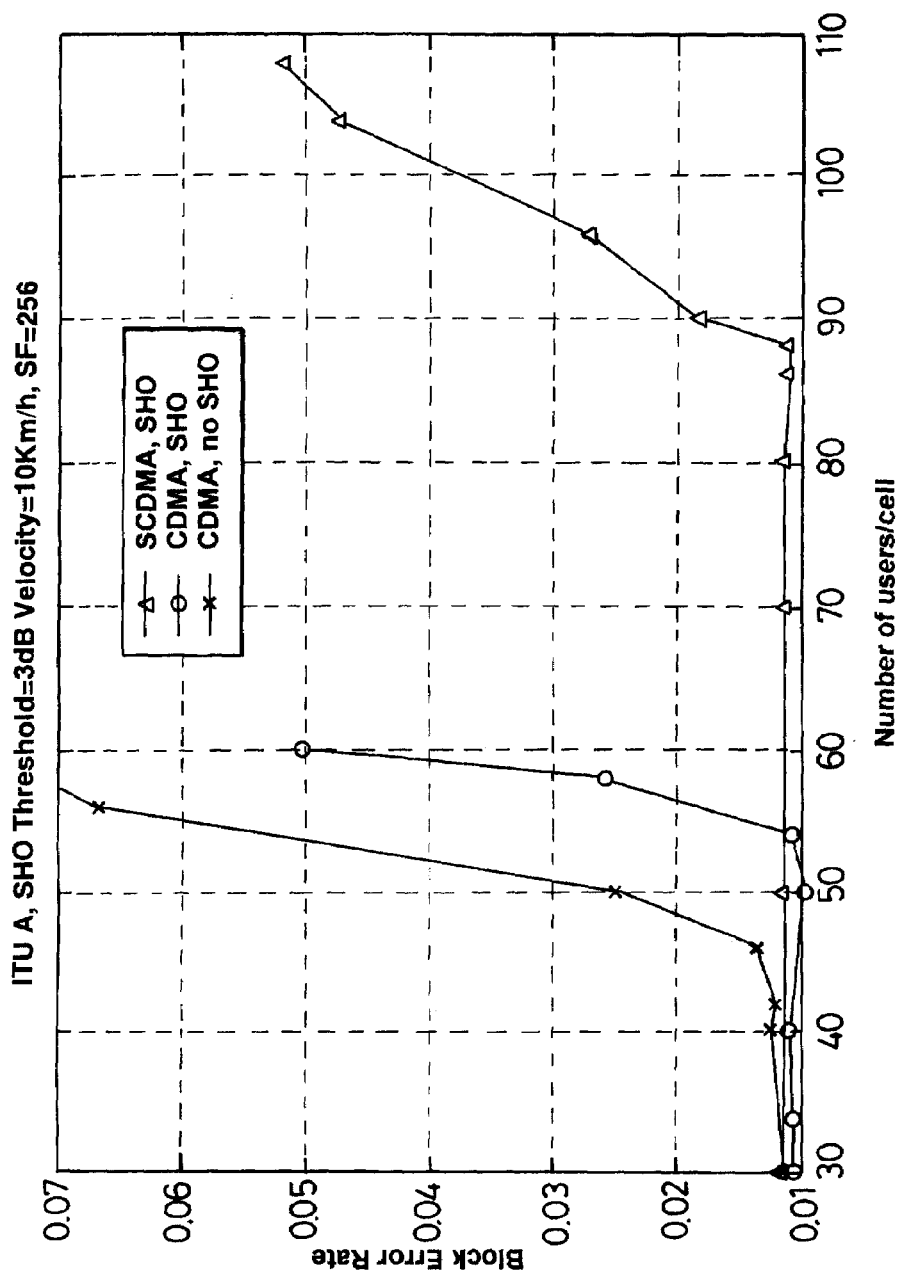
FIG. 11b shows BLER simulated performance results for SCDMA ITU outdoor-indoor channel A.

FIG. 11 illustrates the gain in system performance that may be achieved in the uplink system capacity through implementation of the invention for active control of the transmission timing (i.e. maintaining orthogonality). FIGS. 11a and b show the increase in the number of users per cell that is possible by using a SCDMA system with the ITU-VB channel model (FIG. 11a) and the ITU-A channel model (FIG. 11b) with mobile motion at 10 Km/H.

The desired BLER for these simulations has been set at 1% which means that when the radio system is operating below its maximum capacity, this BLER target should be achieved. Since power control is employed, reducing the number of UEs does not change the achieved BLER as the UEs will reduce their transmitted powers such that the BLER will be maintained at 1%. Two types of channels are simulated. These are the ITU Vehicular Channel B and the ITU Outdoor-Indoor Channel A. According to the recommendations of chapter 9 (Channel Models) the ITU outdoor-indoor channel A percentage of occurrence is 20% while the ITU vehicular channel B percentage of occurrence is 20%. In the Ch A model, most of the received power comes from the main path and hence the channel is similar to a single path channel. Hence, synchronising the main path removes most of the intracell interference. However, in the Ch B model, the second multi-path component is only 2.5 dB below the main path and thus synchronizing only the main path removes part of the intra-cell interference (i.e. less than ½). The Ch B model, however, does benefit from diversity among the different multi-path components. FIG. 11a shows the Ch B simulation results for the multi-cell environment with a velocity of 10 Km/h with and without SHO. The baseline is the asynchronous CDMA (ACDMA) without SHO where the capacity is 92 users/cell. In this case we define the "capacity" as the point where the addition of users causes the BLER to rise above the target (in this case 1%). This figure also illustrates that for this particular combination of parameters, the system capacity increases to 108 users/cell if either SCDMA or SHO is reported. A system using both SCDMA and SHO with a SHO_Threshold of 3 dB has a higher system capacity of 138 users/cell. The application of SCDMA over ACDMA with SHO in a multi-cell environment is about a 28% increase in system capacity (i.e. 28% more users). Note that in this scenario with a 3 dB SHO_Threshold, approximately 20% of the UE are in SHO mode (and are thus synchronised to only their home Node-B). Thus, an increase of 28% in system capacity is observed due to SCDMA when SHO is employed. FIG. 11b shows the capacity simulated with the Ch A propagation model. The simulated capacity is 42 for CDMA without SHO. The capacity is increased to 54 users/cell with SHO. By introducing SCDMA, the capacity is increased to 88 users/cell (an increase of 63% in capacity). The capacity is lower for Ch A with ACDMA because of the loss of the multipath diversity. This loss, however, is compensated for in SCDMA by removing most of the intra-cell interference The simulations report the system capacity gain (users per cell) through the use of SCDMA (USTS) in a multi-cell environment. Assuming that the main multi-path finger is synchronized at the home cell, SCDMA results in 28% increase in system capacity for ITU Ch B and 63% increase for ITU Ch A The present invention has been described with reference to preferred embodiments thereof. Alterations and modifications as would be obvious to those skilled in the art are intended to be incorporated within the scope hereof.

We claim:

1. A method of operating a mobile communications base station which receives signals from a number of high mobility subscriber terminals, each of said subscriber terminal signals comprising a number of multipath components, the method comprising:
   for each subscriber terminal signal received, determining a best signal component; wherein for each determination of a best signal component, the method comprises the steps of:
   determining a difference in time between reception of said best signal component and a reference time; and
   transmitting to said terminal a transmission timing offset value calculated at said base station in order to receive said best signal component at substantially said reference time, said transmission timing offset value comprising said difference in time between reception of said best signal component and said reference time.

2. A method as claimed in claim 1 wherein said offset is in the form of a regular layer 1 timing alignment command having two or more offset absolute magnitude settings.

3. A method as claimed in claim 2 wherein the magnitude settings a minimum setting of 1 microsecond.

4. A method as claimed in claim 1 wherein the best signal component is determined as that having the highest average value of a predetermined signal parameter over a predetermined time.

5. A method as claimed in claim 4 wherein the predetermined signal parameter is signal strength.

6. A method as claimed in claim 4 wherein the average value of said predetermined parameter for a number of signal components over a shortened predetermined period are stored, and wherein in the event of fast fading of the best signal component the signal component having the next highest average value over said shortened period is determined as the best signal component.

7. A method as claimed in claim 4 further comprising determining a new said best component only if said average value is a predetermined threshold above a current best component.

8. A method as claimed in claim 7 further comprising determining a new said best component only if said difference in time is above a predetermined threshold offset.

9. A mobile communications base station which receives signals from a number of high mobility subscriber terminals, each of said subscriber terminal signals comprising a number of multipath components, the base station comprising:
   means for determining a best signal component for each received subscriber terminal signal;
   means for determining a difference in time between reception of said best signal component and a reference time;
   means for transmitting to each said subscriber terminal a transmission timing offset value calculated at the base station in order to receive said best signal component at substantially said reference time, said transmission timing offset value comprising said difference in time between reception of said best signal component and said reference time;
   wherein said time difference determining means is arranged to determine a time difference and said timing offset transmitting means is arranged to transmit a timing offset value for each determination of a best signal component by the best signal component determining means.

10. A base station as claimed in claim 9 wherein said offset is in the form of a regular layer 1 timing alignment command having two or more offset absolute magnitude settings.

11. A base station as claimed in claim 10 wherein the magnitude settings include a minimum setting of 1 microsecond.

12. A base station as claimed in claim 9 wherein the best signal component is determined as that having the highest average value of a predetermined signal parameter over a predetermined time.

13. A base station as claimed in claim 12 wherein the average value of said predetermined parameter for a number of signal components over a shortened predetermined period are stored, and wherein in the event of fast fading of the best signal component the signal component having the next highest average value over said shortened period is determined as the best signal component.

14. A method of operating a high mobility subscriber terminal comprising:
    determining a transmission timing offset value calculated at a base station and transmitted from said base station to said subscriber terminal, said transmission timing offset value comprising a difference in time between reception of a best signal component of a multi-path signal transmitted from said subscriber terminal to said base station and a reference time;
    adjusting the transmission timing of said terminal according to said offset value in order that said best signal component transmitted by said subscriber terminal is received at said base station at substantially said reference time;
    wherein said offset is in the form of a regular layer 1 timing alignment command having two or more absolute magnitude settings.

15. A method as claimed in claim 14 wherein the magnitude settings include a minimum setting of 1 microsecond.

16. A high mobility terminal for use in a mobile communications system, the terminal comprising:
    means for determining a transmission timing offset value calculated at a base station and transmitted from said base station to said subscriber terminal, said transmission timing offset value comprising a difference in time between reception of a best signal component of a multi-path signal transmitted from said subscriber terminal to said base station and a reference time;
    means for adjusting the transmission timing of said terminal according to said offset value in order that said best signal component transmitted by said subscriber terminal is received at said base station at substantially said reference time;
    wherein said offset is in the form of a regular layer 1 timing alignment command having two or more absolute magnitude settings.

17. A high mobility terminal as claimed in claim 16 wherein the magnitude settings include a minimum setting of 1 microsecond.

18. A mobile communications system having a number of high mobility terminals and a base station which receives signals from said terminals; each of said subscriber terminal signals comprising a number of multipath components, the base station comprising:
    means for determining a best signal component for each received subscriber terminal signal;
    means for determining a difference in time between reception of said best signal component and a reference time;
    means for transmitting to each said subscriber terminal a transmission timing offset value calculated at the base station in order to receive said best signal component at substantially said reference time, said transmission timing offset value comprising said difference in time between reception of said best signal component and said reference time;
    wherein said time difference determining means is arranged to determine a time difference and said timing offset transmitting means is arranged to transmit a timing offset value for each determination of a best signal component by the best signal component determining means for each subscriber terminal;
    and each subscriber terminal comprises:
    means for determining a transmission timing offset value transmitted from the base station; and
    means for adjusting the transmission timing of said terminal according to said offset value.

* * * * *